United States Patent
Novac et al.

[11] Patent Number: 5,991,182
[45] Date of Patent: Nov. 23, 1999

[54] ACTIVE RECTIFIER HAVING MINIMAL ENERGY LOSSES

[75] Inventors: Pinchas Novac, Neuchâtel; Rudolf Bugmann, Erlach, both of Switzerland

[73] Assignee: EM Microelectric -Marin SA, Marin, Switzerland

[21] Appl. No.: 09/091,266

[22] PCT Filed: Dec. 23, 1996

[86] PCT No.: PCT/EP96/05825

§ 371 Date: Jun. 17, 1998

§ 102(e) Date: Jun. 17, 1998

[87] PCT Pub. No.: WO97/24795

PCT Pub. Date: Jul. 10, 1997

[30] Foreign Application Priority Data

Dec. 29, 1995 [EP] European Pat. Off. .............. 95120718

[51] Int. Cl.⁶ ........................... H02M 7/06; H02M 7/217
[52] U.S. Cl. .................................................. 363/126
[58] Field of Search .............................. 363/126, 69, 127

[56] References Cited

U.S. PATENT DOCUMENTS 4,139,880 2/1979 Ulmer et al. ............................ 361/246
4,891,837 1/1990 Walker et al. .......................... 379/390

FOREIGN PATENT DOCUMENTS

0 140 418 5/1985 European Pat. Off. .
0 665 634 8/1995 European Pat. Off. .
WO 85/01161 3/1985 WIPO .

*Primary Examiner*—Shawn Riley
*Attorney, Agent, or Firm*—Griffin, Butler, Whisenhunt & Szipl, LLP

[57] ABSTRACT

An active rectifier used in a power supply circuit comprises a diode (4) connected between in input terminal (9) and an output terminal (8). A transistor (2) is formed in a substrate (50) and has a control electrode (5) and two conductive electrodes (6,7) which are respectively connected to the input terminal (9) and the output terminal (8). A comparator (3) is supplied by the power supply circuit and has two inputs (+, −) connected to the input (9) and the output (8) terminals respectively, and an output connected to the transistor control electrode (5).

20 Claims, 5 Drawing Sheets

Fig. 8

ACTIVE RECTIFIER HAVING MINIMAL ENERGY LOSSES

FIELD OF THE INVENTION

The present invention concerns rectifiers, and in particular rectifiers which comprise a diode connected between an input and an output terminal.

BACKGROUND OF THE INVENTION

It is known to use rectifiers in order to entirely or partially constitute circuits which transform an alternating voltage produced by a voltage generator into a direct-current voltage suitable for supplying power to electronic circuitry: such a rectifier is known from the document WO 85/01161 which describes a rectifier according to the preamble of claim 1. Such circuits are used, for example, in wristwatches which feature an AC voltage generator and a time-keeping circuit driven by the power generated therefrom. In wristwatches of this type, a rectifier circuit is needed to convert the alternating voltage produced by the AC voltage generator into a DC voltage for driving the time-keeping circuit. In known wristwatch applications, rectifier circuits performs either half-wave rectification by means of a single diode, or full-wave rectification by means of a bridge employing four diodes arranged in a conventional manner.

However, in forward bias a diode exhibits a voltage drop between its input and output terminals which is slightly greater than the threshold voltage at which current begins to flow in the diode. For silicon junction diodes, this voltage drop may be approximately 0.7 volts, 0.4 volts in the case of a Schottky diode. The voltage supplied to the time-keeping circuit can therefore be as much as 1.4 volts less than the voltage provided by the AC voltage generator, with the result that power is lost. In many circumstances, such as in low-power, low-voltage applications, this power loss becomes significant and undesirable.

In order to overcome this loss, it would in theory be possible to increase the number of turns in the AC generator's coil. However, a coil having a large number of turns is bulky and may be difficult to house in the limited space available in a timepiece of small volume such as a wristwatch. If one were to produce this coil with a wire having a sufficiently small diameter for it not to be bulky, it becomes difficult and costly to manufacture. Increasing the number of turns of the AC generator's coil would also increase the resistance of the coil and hence add to the power loss.

Furthermore, the above-mentioned voltage drop results in a reduction in the energy able to be supplied to and subsequently stored by the time-keeping circuit. If the AC generator is inoperative for any sustained period of time, there is therefore less energy available to drive and maintain the correct functioning of the time-keeping circuit during such periods of inoperability.

SUMMARY OF THE INVENTION

An object of the present invention is to provide a rectifier which alleviates or overcomes the disadvantages of known rectifiers.

Another object of the invention is to provide a rectifier which minimises the energy loss during the conversion of an alternating signal to a direct-current signal.

Yet another object of the invention is to provide a rectifier which can be realised in the form of an integrated circuit, preferably in CMOS technology, which minimises the number of required external components.

Still another object of the invention is to provide a rectifier which is simple to realise, which is efficient and which occupies a minimum of space.

With this in mind, the present invention provides a rectifier for use in a power supply circuit, comprising a diode connected between an input and an output terminal, chlaracterised in that said rectifier further comprises a transistor formed in a substrate and having a control electrode and two conductive electrodes, these latter being connected respectively to said input and said output terminals, and a comparator supplied by said power supply circuit and having two inputs respectively connected to said input and said output terminals, and an output connected to said transistor control electrode.

The diode ensures conduction of the rectifier between the input and output terminals at start-up. Once the minimum supply voltage of the comparator has been reached, the diode is short-circuited by the comparator-controlled transistor so that in normal operation the voltage drop across the rectifier substantially decreases.

In a preferred embodiment of the invention, the diode may be constituted by a parasitic junction diode formed in the substrate, so as to still further minimize the number of external components which are required.

Other objects and advantages of the present invention will become apparent from the following description of a non-limitative example of various embodiments of the rectifier.

DETAILED DESCRIPTION OF THE INVENTION

Figure 1:
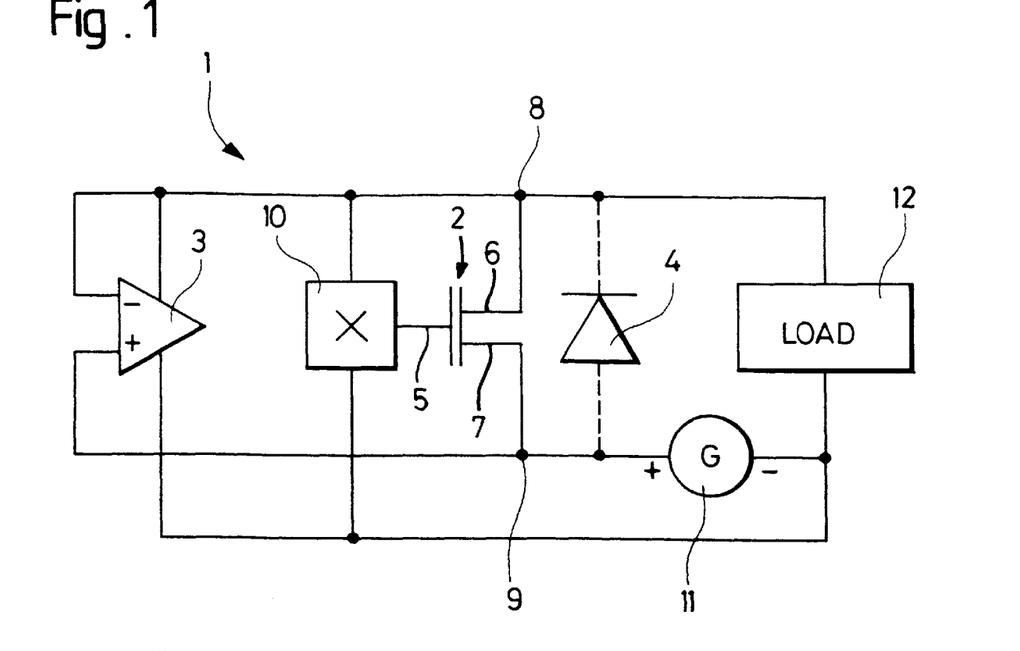
FIG. 1 is a schematic circuit diagram of an embodiment of a half-wave rectifier circuit including a rectifier according to the invention.

Referring now to FIG. 1, there is shown an active rectifier 1 comprising a MOS transistor 2, a comparator 3 and a diode 4, this latter being preferably formed from the diffusion of the MOS transistor 2 into a substrate. In this context, the phrase "active rectifier" is intended to refer to devices which rectify an alternating signal by using at least one active element, such as an operational amplifier, comparator, transistor or like element, which must be supplied by a power source, as opposed to "passive rectifiers" which use passive elements only, such as a diode. Similarly, the word "substrate" in the following description is intended to refer to a substrate, well or any other structure in which a transistor is formed.

The MOS transistor 2 includes a gate 5, a source 6 and a drain 7, these latter two being respectively connected to an output terminal 8 and an input terminal 9. The MOS transistor 2 is preferably a normally OFF device, such as an enhancement-type MOSFET, which has no appreciable drain current flow when the voltage applied between its gate and source is zero.

The two inputs of the comparator 3 are respectively connected to the terminals 8 and 9. The output of the comparator 3 is connected to the gate 5 of the MOS transistor 2, preferably via a voltage multiplier 10. During operation, the comparator 3 compares the potential difference between the terminals 8 and 9. A logical high signal is provided to the input of the voltage multiplier 10 when the potential difference between the terminals 9 and 8 is positive. Similarly, the comparator 3 provides a logical low signal to the input of the voltage multiplier 10 when the potential difference between the terminals 9 and 8 is negative.

The voltage multiplier 10 amplifies the output signal from the comparator 3 before it is applied to the gate 5 of the transistor 2. The voltage thus applied by the voltage multiplier 10 between the gate and the source of the MOS transistor 2 acts to maximise the drain current of the transistor 2 at any given drain-source voltage. Consequently, the resistance between the drain and source is kept extremely low when the transistor 2 is in a conductive state. This phenomenon is referred to as negative gate overdrive in the case of a p-type MOS transistor, or positive gate overdrive in the case of an n-type MOS transistor. It will be appreciated, however, that other embodiments of the invention may omit the use of such a voltage multiplier as significant reduction in the voltage drop across the active rectifier according to the invention is achieved even without this feature.

The terminals 8 and 9 of the active rectifier 1 are connected in series with an AC generator 11, which supplies an AC voltage across its terminals, and a load 12. The active rectifier 1 provides half-wave rectification of the AC voltage supplied by the AC generator 11 and supplies this DC rectified voltage to the load 12. The load 12 includes at least one capacitive element to enable it to store charge and thus, as will be explained below, act as a power supply for the comparator 3 and the voltage multiplier 10.

The active rectifier 1 provides its own supply voltage, in the sense that the comparator 3 and the voltage multiplier 10 are both driven by the rectifier DC voltage generated by the active .rectifier 1 itself. The comparator 3 and the voltage multiplier 10 each comprise two power supply terminals which are respectively connected to the terminal 8 and the common point between the AC generator 11 and the load 12.

The AC generator 11 may be of a type commonly incorporated in wristwatches, and will not be described in detail. Such wristwatches include an oscillating weight in which the centre of rotation and the centre gravity are eccentric with respect to each other. The rotation of the oscillating weight, caused by movement of the wristwatch, is arranged to cause rotation of a rotor forming part of the AC generator. The rotor includes a permanent magnet and is surrounded by a stator. A coil is wound on a core forming part of the stator. Rotation of the rotor induces in the coil an electromagnetic force in the form of an alternating voltage.

When the load 12 is completely discharged, for example when a wristwatch including the circuit shown in FIG. 1 has been left in a stationary position for a long time, no current flows in the AC generator 11, the active rectifier 1 or the load 12. Consequently, there is substantially no voltage present between the terminal 8 and the common point between AC generator 11 and the load 12. There is therefore insufficient supply voltage to enable the operation of the comparator 3 and the voltage multiplier 10. In the absence of a signal applied to its gate 5, the MOS transistor is in a non-conductive state and no appreciable drain current flows.

Upon activation of the AC generator 11, for example when the wristwatch is picked up and worn by a user, an AC voltage is generated across its terminals and a corresponding AC current begins to flow. As the MOS transistor 2 is in a non-conductive state, this current flows through, and is half-wave rectified by, the parasitic diode 4. A rectified DC voltage is thus established across the load 12, thereby enabling this latter to perform its designed operation. In the case of a wristwatch, the load 12 may be a time-keeping circuit, and activation of the AC generator 11 will enable the time-keeping circuit to commence time-keeping operations.

Once this current flow has been established, the load 12 is able to store sufficient charge for the voltage between the active rectifier terminal 8 and the common point between the AC generator 11 and the load 12 to exceed the minimum supply voltage required to enable operation of the comparator 3 and the voltage multiplier 10.

Due to the current flow through the parasitic diode 4, a potential difference of approximately 0.7 volts is initially present between the active rectifier terminals 8 and 9. Once at least a minimum supply voltage is available, this potential difference can be detected by the comparator 3 which, together with the voltage multiplier 1C, provides a signal to the gate 5 of the MOS transistor 2, thereby causing this latter to conduct. Due to its extremely low resistance, the MOS transistor 2 thus effectively short-circuits the parasitic diode 4, which thereby results in the voltage drop across the terminals 8 and 9 of the active rectifier 1 being substantially reduced.

Thereafter, the AC current generated by the AC generator 11 continues to be half-wave rectified by the combination of the comparator 3, the MOS transistor 2 and, in this embodiment, the voltage multiplier 10, for as long as the voltage between the active rectifier terminal 8 and the common point between the AC generator 11 and the load 12 exceeds the minimum required supply voltage. The MOS transistor 2 is thus placed in a conductive state each positive half-cycle, and in a non-conductive state each negative half-cycle, of the alternating voltage generated by the AC generator 11.

It will be understood that the MOS transistor 2 of FIG. 1 may be constituted either by a n-type MOS (NMOS) or a p-type MOS (PMOS) transistor.

Figure 2:
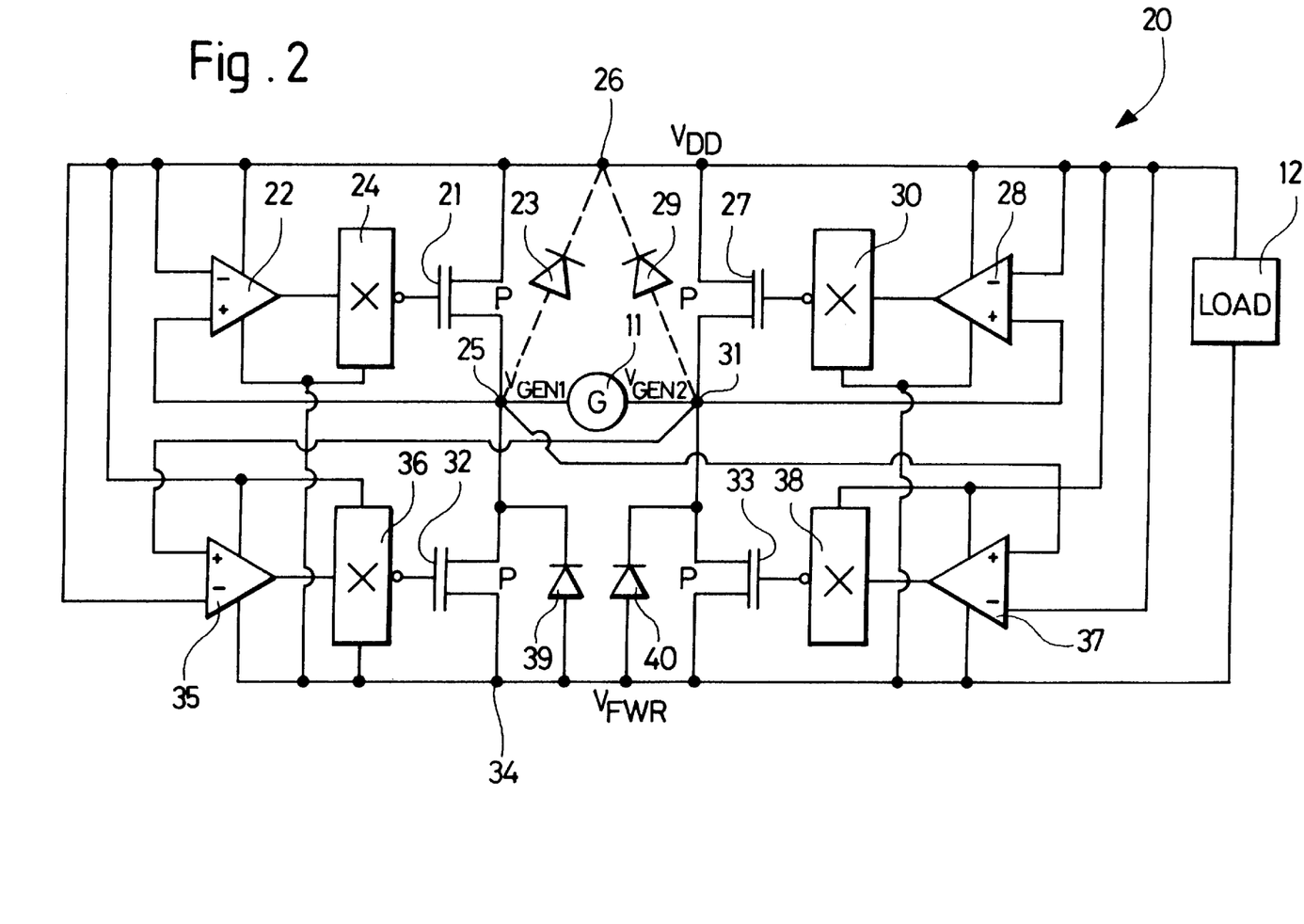
FIG. 2 is a schematic circuit diagram of an embodiment of a full-wave rectifier circuit including a plurality of rectifiers according to the invention.

Referring now to FIG. 2, there is shown another embodiment of a rectifier circuit for use with the AC generator 11 and the load 12 of FIG. 1. The rectifier circuit 20 is a full-wave rectifier circuit and, as will be seen, includes a plurality of rectifiers according to the present invention. The rectifier circuit 20 comprises a first PMOS transistor 21 and associated comparator 22, parasitic diode 23 and voltage multiplier 24. These elements are interconnected, in the manner described above in relation to the active rectifier 1 of FIG. 1, between two terminal 25 and 26. Similarly, the rectifier circuit 20 includes another PMOS transistor 27 and associated comparator 28, parasitic diode 29 and voltage multiplier 30, which are also interconnected, in the manner described above, between the terminal 26 and a terminal 31.

The rectifier circuit 20 comprises two further PMOS transistors 32 and 33. The PMOS transistor 32 is connected to an associated comparator 35 and voltage multiplier 36, whilst the PMOS transistor 33 is connected to an associated comparator 37 and voltage multiplier 38, respectively interconnected in the above-described manner. The drain and source of the PMOS transistor 32 are connected between the terminal 25 and a terminal 34, whilst the drain and source of the PMOS transistor 33 are connected between the terminals 31 and 34.

The two inputs of the comparator 35 are respectively connected to the terminals 26 and 31, whilst the two inputs of the comparator 37 are respectively connected to the terminals 25 and 26.

In addition, the rectifier circuit 20 includes two non-parasitic diodes 39 and 40 respectively connected between the drain and the source of the PMOS transistors 32 and 33. These diodes may be, for example, discrete diodes or integrated diodes, such as polycrystalline diodes.

The AC generator 11 has its two output terminals connected between the terminals 25 and 31, whilst the terminals 26 and 34 are connected to the load 12 in order to provide a supply voltage thereto. The potentials of these two latter terminals are respectively referenced $V_{DD}$ and $V_{FWR}$. In addition, the potentials of the terminals 25 and 31 are respectively referenced $V_{GEN1}$ and $V_{GEN2}$.

Figure 3:
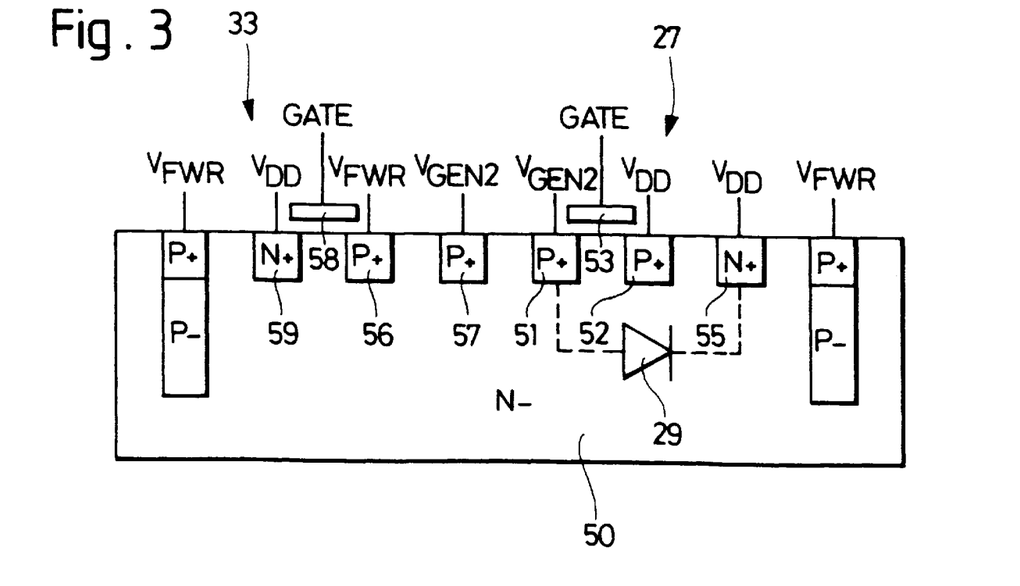
FIG. 3 is a schematic cross-sectional diagram of the transistors constituting part of two of the rectifiers of FIG. 2.

FIG. 3 shows a cross-sectional view of the PMOS transistors 27 and 33 diffused into a substrate 50. The transistors 21 and 32 may also be diffused into the substrate 5C) so as to have a structure which is substantially identical to that shown in FIG. 3.

In this embodiment, the substrate 50 is formed of weakly doped n-type silicon, as designated by the symbol N-. The PMOS transistor 27 comprises two heavily doped p-type regions 51 and 52 which constitute its drain and source. A polycrystalline silicon or metallic electrode 53 forms the gate of the PMOS transistor 21 and is separated from the channel between the regions 51 and 52 by a thin insulating material (not shown), such as silicon dioxide. In addition, a heavily doped n-type region 55 which is associated with the PMOS transistor 27 is diffused into the substrate 50 to connect this latter to a supply potential $V_{DD}$ so as to enable the appropriate biasing of the substrate 50.

Similarly, the PMOS transistor 33 comprises two heavily doped p-type regions 56 and 57 which constitute its source and drain. A polycrystalline silicon or metallic electrode 58 forms the gate of the PMOS transistor 33 and is separated from the channel between the regions 56 and 57 by a thin insulating material of silicon dioxide. A heavily doped n-type regions 59 which is associated with the PMOS transistor 33 is diffused into the substrate 50 to connect this latter to a supply potential VDE so as to enable the appropriate biasing of the substrate 50.

As will be appreciated by a person skilled in semiconductor devices, a junction diode is formed by two contiguous zones of extrinsic silicon, respectively with a p-type dopant and an n-type dopant. The boundary at the p and n regions is called the pn junction and the p and n regions form respectively the anode and cathode of the junction diode. Referring again to FIG. 3, it can be seen that, due to the diffusion of the PMOS transistor 27, the parasitic junction diode 29 is inherently formed between the p-type region 51 and the n-type substrate 50, this latter being anchored to the supply potential $V_{DD}$ through regions such as the n-type region 55. This parasitic junction diode 29 is thus effectively connected in parallel across the drain and the source of the PMOS transistor 27 and provides for conduction of its associated active rectifier branch whilst the supply voltage to the comparator and voltage multiplier are less than the required minimum supply voltage of these latter. In the same way, the parasitic junction diode 23 is inherently formed in the substrate 50 due to the diffusion of the PMOS transistor 21.

In the embodiment shown in FIG. 2, however, no such parasitic diodes are formed across the drain and source of the PMOS transistors 32 and 33. The diodes 39 and 40 must therefore be formed by discrete diodes, either separately diffused into the substrate 50 or formed externally from the substrate 50.

When a wristwatch including the circuit shown in FIG. 2 has been left in a stationary position for a long time, the load 12 is completely discharged and no current flows in the AC generator 11, the active rectifier 20 or the load 12. Consequently, there is substantially no voltage present between the terminal 26 and 34. There is therefore insufficient supply voltage to enable the operation of the comparators 22, 28, 35 and 37 and the voltage multipliers 24, 30, 36 and 38. In the absence of an appropriate control signal applied to their respective gates, the FMOS transistors 21, 27, 32 and 33 are in a non-conductive state and no appreciable drain current flows through any of these transistors.

Upon activation of the AC generator 11, an AC voltage is generated across its terminals. In the positive half-cycle of this AC voltage (i.e. when the potential $V_{GEN1}$ is greater than $V_{GEN2}$), this current initially flows through the parasitic diode 23, across the load 12 and across the discrete diode 40. Similarly, in the negative half-cycle of this AC voltage (i.e. when the potential $V_{GEN1}$ is less than $V_{GEN2}$), this current flows through the parasitic diode 29, across the load 12 and across the discrete diode 39.

A rectified DC voltage is thus established across the load 12, thereby enabling this latter to perform its designed operation. In the case of a wristwatch, the load 12 may be a time-keeping circuit, and activation of the AC generator 11 will enable the time-keeping circuit to commence time-keeping operations.

Once this current flow has been established, the load 12 is able to store sufficient charge for the voltage between the terminals 26 and 34 to exceed the minimum supply voltage required to enable operation of the comparators 22, 38, 35 and 37 and the voltage multipliers 24, 30, 36 and 38.

Once at least a minimum supply voltage is available, during each positive half-cycle of the AC voltage supplied by the AC generator 11, the potential difference across the diode 23 is able to be detected by the comparator 22 which, together with the voltage multiplier 24, provides a signal to the gate of the PMOS transistor 21, thereby causing this latter to conduct. Due to its extremely low resistance, the PMOS transistor 21 thus effectively short-circuits the parasitic diode 23, which thereby results in the voltage drop across the terminals 26 and 25 of the active rectifier 20 being substantially reduced.

Since the input terminals of the comparators 22 and 37 are both respectively connected to the terminals 25 and 26, the comparator 37, together with the voltage multiplier 38, will similarly cause the PMOS transistor 33 to conduct during each positive half-cycle. The PMOS transistor 33 thus effectively short-circuits the discrete diode 40, which thereby results in the voltage drop across the terminals 31 and 34 of the active rectifier 20 being substantially reduced.

In the same manner, during each negative half-cycle of the AC voltage supplied by the AC generator 11, the potential difference across the diode 29 is detected by the comparator 28 which, together with the voltage multiplier 30, provides an appropriate control signal to the gate of the PMOS transistor 27, thereby causing this latter to conduct. The PMOS transistor 27 thus short-circuits the parasitic diode 29, which thereby results in the voltage drop across the terminals 26 and 31 of the active rectifier 20 being substantially reduced.

Since the input terminals of the comparators 28 and 35 are both respectively connected to the terminals 26 and 31, the comparator 35, together with the voltage multiplier 36, will similarly cause the PMOS transistor 32 to conduct during each negative half-cycle. The PMOS transistor 32 thus effectively short-circuits the discrete diode 39, which thereby results in the voltage drop across the terminals 25 and 34 of the active rectifier 20 being substantially reduced.

By considering the operation of the rectifier 20 of FIG. 2, it will be realised that there is a certain duplication of function in some of its constituent parts. To that effect, it can be seen from thus figure that the two inputs of the comparators 22 and 37 are both connected to the terminals 26 and 25 and that their operation is therefore identical. Similarly, it can also be seen that the operation of the comparators 28 and 35, the voltage multipliers 24 and 38 and the voltage multipliers 30 and 36 are also identical. It is therefore possible to omit some or all of these duplicated circuit elements in order to simplify the design of the rectifier according to the present invention.

Figure 4:
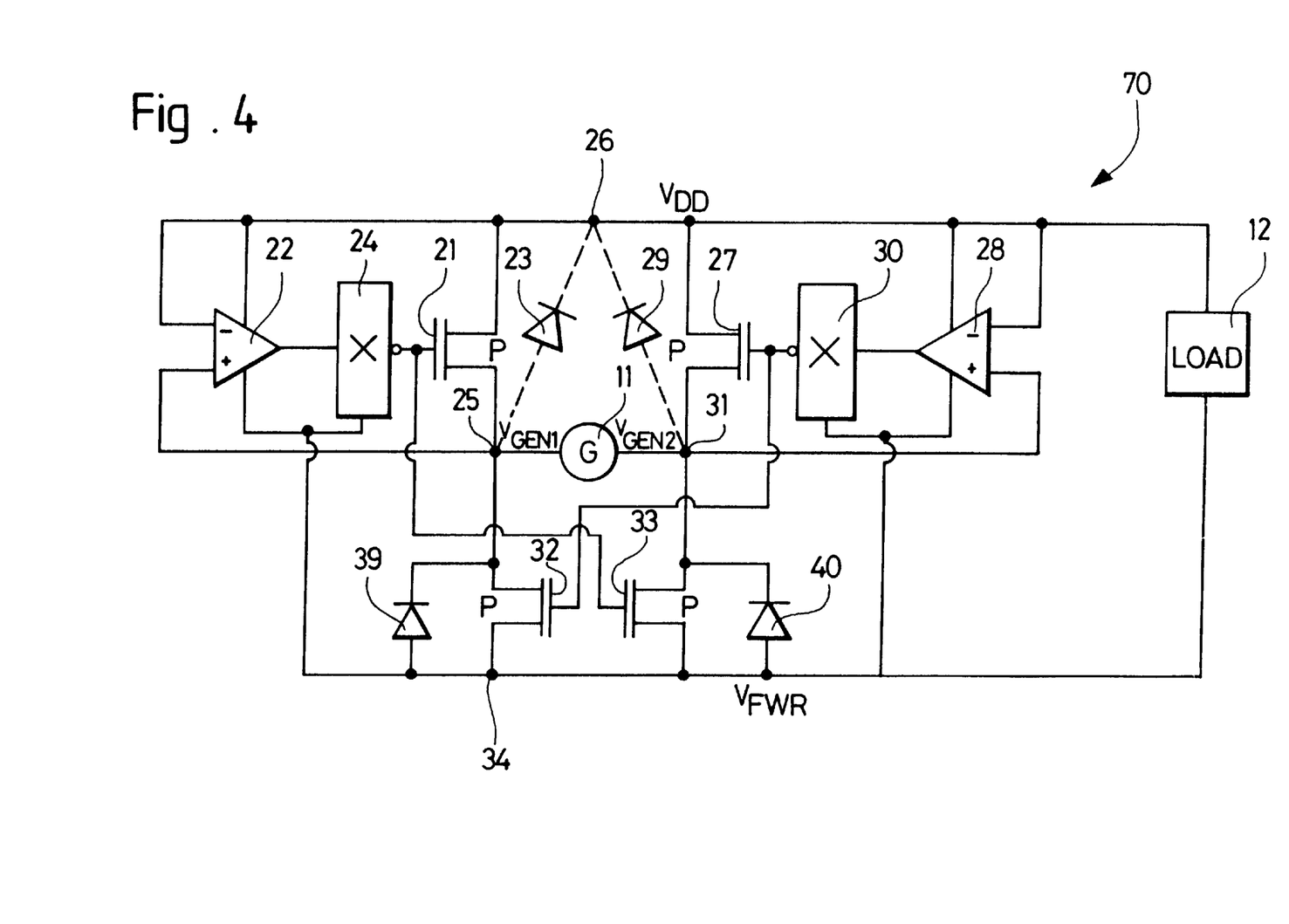
FIG. 4 is a schematic circuit diagram of another embodiment of a full-wave rectifier circuit including a plurality of rectifiers according to the invention.

Referring now to FIG. 4, there is shown a rectifier 70 representing a further embodiment of the present invention and in which these duplicated elements have been omitted. The rectifier 70 is identical to the rectifier 20 of FIG. 2 except that the comparators 35 and 37 and the voltage multipliers 36 and 38 have been left out. As a consequence, the gate of the PMOS transistor 32 is directly connected to the output of the voltage multiplier 30, whilst the gate of the PMOS transistor 33 is directly connected to the output of the voltage multiplier 24.

In spite of this simplification, there may nevertheless be applications in which the rectifier 20 of FIG. 2 is to be preferred over the rectifier 70 of FIG. 4. As the comparators 22 and 28 in the rectifier 70 are each required to drive two MOS transistors via two voltage multipliers, their energy consumption will be greater than the corresponding comparators in the rectifier 20 of FIG. 2. Similarly, as the voltage multipliers 24 and 30 forming part of the rectifier 70 each drive two MOS transistors, their surface area will be greater than the corresponding voltage multipliers in the rectifier 20.

The embodiments of the present invention shown in FIGS. 2 and 4 each required non-parasitic diodes to be connected across the drain and source of two transistors in forming the rectifier bridge of the rectifier 20 and 70, namely the discrete diodes 39 and 40 connected across the drain and source of the PMOS transistors 32 and 33.

Figure 5:
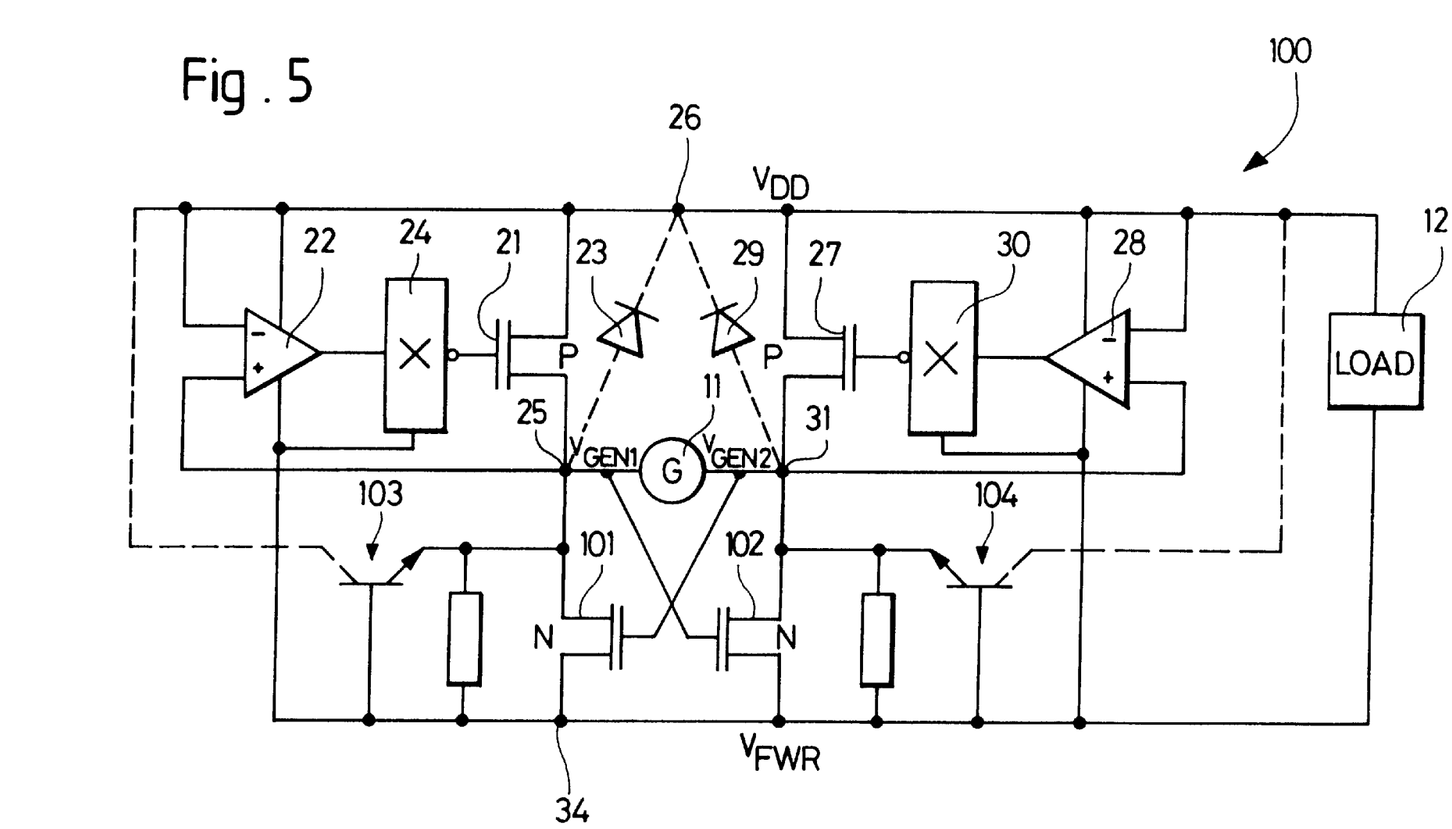
FIG. 5 is a schematic circuit diagram of yet another embodiment of a full-wave rectifier circuit including a plurality of rectifiers according to the invention.

FIG. 5 shows a further embodiment of the invention in which such discrete components are not required. This figure shows a rectifier 100 which is identical to the rectifier 70 of FIG. 4 except that the PMOS transistors 32 and 33, as well as the discrete diodes 39 and 40, have been omitted. In their place, the rectifier 100 comprises two NMOS transistors 101 and 102. The drain and the source of the NMOS transistor 101 are respectively connected to the terminals 25 and 34, whilst the drain and the source of the NMOS transistor 102 are respectively connected to the terminals 31 and 34. The gates of the NMOS transistors 101 and 102 are respectively connected to the terminals 31 and 25.

In addition, the full-wave rectifier 100 comprises two parasitic bipolar junction transistors 103 and 104 which are formed as a consequence of the drain diffusion of the NMOS transistors 101 and 102. This will now be explained with reference to FIG. 6, which shows a cross-sectional view of the PMOS transistor 27 (already described in relation to FIG. 3) and the NMOS transistor 102, which advantageously are diffused into a substrate 50 as complementary MOS transistors (CMOS). It will be appreciated that the transistors 21 and 101 may also be diffused into the substrate 50 so as to have a structure which is substantially identical to that shown in FIG. 3.

Figure 6:
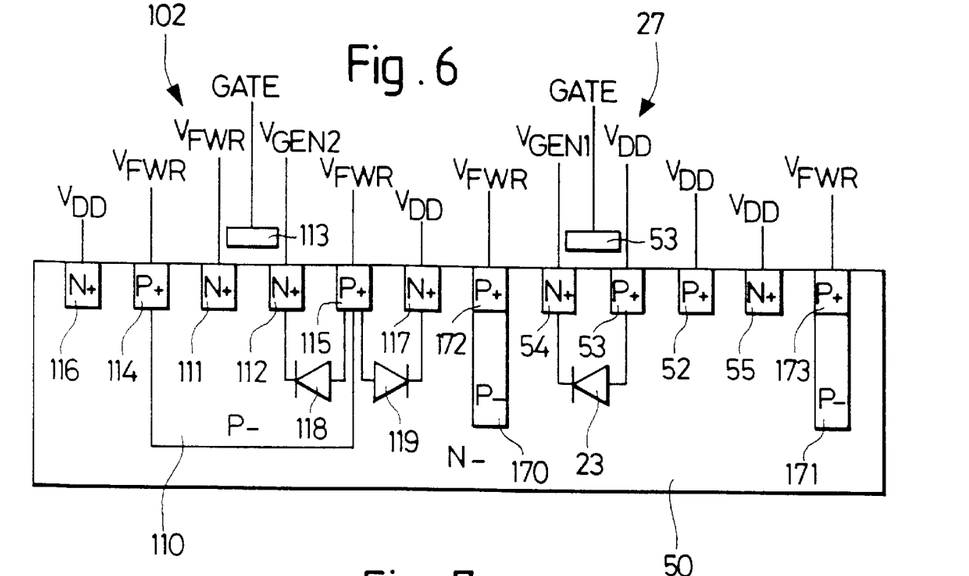
FIG. 6 is a schematic cross-sectional diagram of the transistors constituting part of the rectifier of FIG. 5.

The NMOS transistor 102 comprises a weakly doped p-type well 11.0 diffused into the n-type substrate 50. Two heavily doped n-type regions 111 and 112, constitute respectively the source and drain of the transistor 102. A polycrystalline silicon or metallic electrode 113 forms the gate of the NMOS transistor 102 and is separated from the channel between the regions 111 and 112 by a thin insulating material (not shown), such as silicon dioxide.

Two heavily doped p-type regions 114 and 115 are diffused into the substrate 50 to connect the p-type well to a supply potential $V_{FWR}$. In addition, two heavily doped n-type regions 116 and 117 are diffused into the substrate 50 so as to enable the appropriate biasing of the substrate 50 to $V_{DD}$.

As can be seen from FIG. 6, the diffusion of the NMOS transistor 102 inherently forms a parasitic junction diode 118 between the n-type region 112 and the p-type region 110, this later being anchored to the supply potential $V_{FWR}$ through regions such as the p-type regions 114 and 115. In addition, a parasitic junction diode 119 is formed between the p-type region 110 and the n-type substrate 50, this latter being anchored to the supply potential $V_{DD}$ through regions such as the n-type regions 116 and 117. These two junction diodes 118 and 119 respectively form the base-emitter junction and collector-base junction of the parasitic bipolar junction transistor 104 shown in FIG. 5. The base-emitter junction diode of the parasitic bipolar junction transistor 104 provides for conduction of its associated active rectifier branch during start-up conditions of the active rectifier 100 whilst the supply voltage to the comparators 22 and 28 and the voltage multipliers 24 and 30 are less than their required minimum supply voltage.

The parasitic bipolar junction transistor 103 is similarly formed due to the diffusion of the NMOS transistor 101 shown in FIG. 5.

During the positive half-cycle of the AC voltage generated by the AC generator 11, the potential difference $V_{GEN1}-V_{FWR}$ applied between the grill and the source of the NMOS transistor 102 causes this latter to conduct. This effectively short-circuits the parasitic junction diode formed by the base-emitter junction of the transistor 104. Accordingly, the AC current generated by the AC generator 11 flows through the PMOS transistor 21, across the load 12 and through the NMOS transistor 102 during each positive half-cycle.

During each negative half-cycle of the AC voltage generated by the AC generator 11, the potential difference $V_{GEN2}-V_{FWR}$ applied between the grill and the source of the NMOS transistor 101 causes this latter to conduct, effectively short-circuiting the parasitic junction diode formed by the base-emitter junction of the transistor 103. The AC current generated by the AC generator 11 thus flows through the PMOS transistor 27, across the load 12 and through the NTMOS transistor 101.

Advantageously, the embodiment of the active rectifier shown in FIG. 5 may be realised using CMOS fabrication techniques, so that the MOS transistors 21, 27, 101 and 102 are constituted by two n-type/p-type complementary MOS transistor pairs.

The resistance RON between the drain and source of a MOS transistor in forward conduction is given by the following:

$$R_{ON} = \frac{1}{\frac{W}{L}\beta(V_{GS} - V_T)}$$

where W is the width of the transistor channel, L is the length of the transistor channel, $V_{GS}$ is the grill-source voltage, $V_T$ is the threshold voltage and β is the current gain of a transistor having a ratio W/L equal to 1.

The active rectifier 100 takes advantage of the fact that the current gain β of an NMOS transistor is approximately three times greater than that of a PMOS transistor. The resistance $R_{ON}$ and consequently the source-drain voltage drop of an NMOS transistor is thus inherently less than that of a PMOS transistor of similar dimensions.

Nevertheless, the voltage drop across each of the NMOS transistors 101 and 102 may be still further reduced in their conductive state by the provision of two voltage multipliers having their inputs respectively connected to the terminals 31 and 25 and their outputs respectively connected to the gate of the transistor 101 and the gate of the transistor 102.

Figure 7:
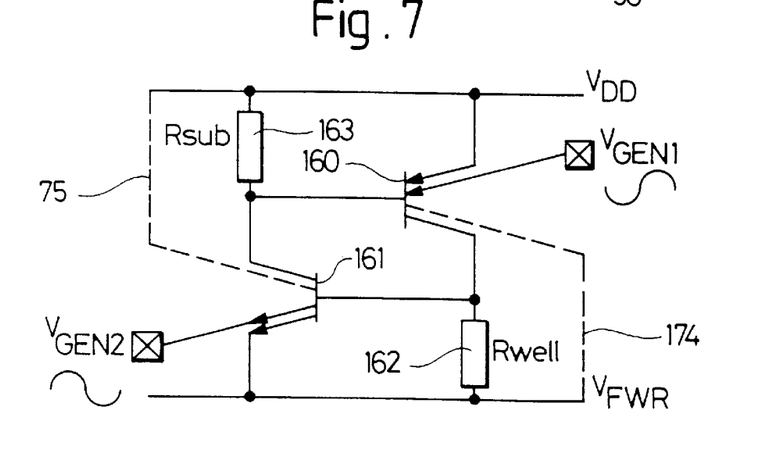
FIG. 7 is a schematic diagram of several parasitic elements formed by the diffusion of the two transistors of FIG. 5.

Referring now to FIG. 7, there is shown a schematic diagram of some parasitic elements present in the structure represented in FIG. 5. These elements comprise two parasitic bipolar junction transistors 160 and 161 and two parasitic resistors 162 and 163.

As can be seen from FIG. 6, the lateral bipolar junction transistor 160 is constituted by the junction diode between the p-type zone 51 and the n-type substrate 50 (emitter-base junction) and the junction diode between the p-type well 110 and the n-type substrate 50 (collector-base junction). Furthermore, an additional emitter-base junction is formed by the junction diode between the p-type zone 52 and the n-type substrate 50. The collector of the parasitic transistor 160 is connected to the p-type zone 115 via the parasitic resistor 162 which represents the resistance to current flow across the p-type well 110.

Similarly, the vertical bipolar junction transistor 161 is constituted by the junction diode between the n-type zone 112 and the p-type well 110 (emitter-base junction) and the junction diode between the p-type well 110 and the n-type substrate 50 (collector-base junction). An additional emitter-base junction is also formed by the junction diode between the n-type zone 111 and the p-type well 110. The collector of the parasitic transistor 161 is connected to the n-type zone 54 via the parasitic resistor 163 which represents the resistance to current flow across the n-type substrate 50.

It will be noted that the base of the transistor 161 and the collector of the transistor 160 are common (i.e. the n-type substrate 50), as are the base of the transistor 160 and the collector of the transistor 161 (i.e. the p-type well 110).

When the MOS transistors 21, 27, 101 and 102 of FIG. 5 are diffused into the substrate 50 of FIG. 6, care must be taken to avoid the risk of a latch-up effect. This phenomenon, which is well-known in CMOS technology, can be understood by considering the elements shown in FIG. 7. During each positive half-cycle of the AC voltage provided by the AC generator 11, the potential difference $V_{GEN1}-V_{DD}$ induces a collector-emitter current in the transistor 160. This collector current flows across the resistor 162 and creates a potential difference thereacross. This potential difference is applied between the base and the emitter of the transistor 161, which causes this latter to conduct. A collector current is thus created which flows through the resistor 163 and creates a potential difference thereacross. This potential difference is applied between the base and the emitter of the transistor 160, which thus ensures that this latter remains in a conductive state.

A similar latch-up effect can be triggered when the potential difference $V_{FWR}-V_{GEN2}$ induces a collector-emitter current in the transistor 161. These two latch-up triggering mechanisms are characteristic of CMOS circuits, but in the embodiment shown in FIG. 5 these triggering mechanisms occur simultaneously.

It can therefore be seen that each transistor may prevent the other from being able to alternate between a conductive and a non-conductive state. Such a latch-up or race-around condition would effectively block operation of the transistors and prevent the active rectifier from operating correctly. In particular, during the latch-up state, the current consumption may be as high as 100 mA and the rectifier will be prevented from ever starting operation. The latch-up risk is greater for embodiments which use both n-type and p-type transistors, due to the creation of parasitic bipolar junction transistors as shown in FIG. 7.

Several improvements may be made to the topology of the active rectifiers 20, 70 and 100 in order to address these concerns.

As seen in FIG. 6, for example, weakly doped p-type zones 170 and 171 are diffused into the substrate 50. On top of these zones are respectively diffused heavily doped p-type zones 172 and 173. Whilst represented as separate zones in FIG. 6, the zones 170 to 173 may in fact be diffused in the form of a p-type ring which entirely surrounds the PMOS transistor 27. This ring acts as a pseudo collector of the parasitic transistor 160 which is "directly connected" to the potential $V_{FWR}$, as shown by the reference 174 in FIG. 7. In this way, the collector current flowing through the parasitic resistor 162 is minimised and the risk of applying a base-emitter voltage sufficient to cause the transistor 161 to conduct is thus reduced. Preferably, the zones 170 and 171 as shown in FIG. 6 are diffused to a depth at least equal to that of the p-type well 110 so as to maximise this effect.

Similarly, the zones 116 and 117 may also be diffused in the form of an n-type ring which entirely surrounds the NMOS transistor 102. This ring acts as a pseudo collector of the parasitic transistor 161 and is "directly connected" to the potential $V_{DD}$, as shown by the reference 175 in FIG. 7, so as to minimise the collector current flowing through the parasitic resistor 163 and reduce the risk of applying a base-emitter voltage sufficient to cause the conduction of transistor 160.

Furthermore, the zones 114 and 115 may be diffused in the form of a second ring, in this case a p-type ring, which also entirely surrounds the NMOS transistor 102. By minimising the distance separating this ring from the transistor 102, the resistance of the resistor 162 is able to be minimised, which contributes to minimising the base-emitter voltage applied to the transistor 160.

The zones 54 and 55 may also be diffused in the form of a second ring, in this case an n-type ring, which also entirely surrounds the PMOS transistor 27. By minimising the distance separating this ring from the transistor 27, the resistance of the resistor 163 is able to be minimised, which contributes to minimising the base-emitter voltage applied to the transistor 161.

Figure 8:
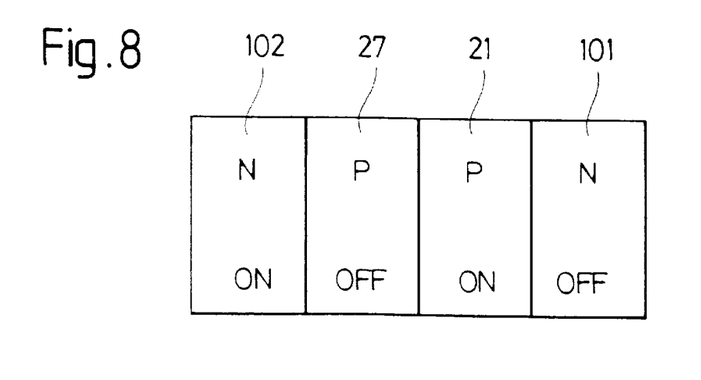
FIG. 8 is a schematic diagram showing an embodiment of the spatial arrangement of the MOS transistors of the rectifiers of FIG. 4.

In addition, due to the previously mentioned double triggering mechanism, it is advantageous to separate from each other the MOS transistors which conduct during each half-cycle of the AC signal provided by the AC generator 11. For example, as shown in FIG. 8, the PMOS transistor 21 and the IMOS transistor 102, both of which conduct during each positive half-cycle, may be separated by the PMOS transistor 27. Similarly, the PMOS transistor 27 and the NMOS transistor 101, both of which conduct during each negative half-cycle, may be separated by the PMOS transistor 21. Such a separation of the two MOS transistors which conduct at any given time acts to reduce the current gain of the bipolar transistors 160 and 161 so that it is more difficult to reach a latch-up condition.

In other embodiments of the invention where four PMOS transistors are used, the PMOS transistors, such as those referenced 32 and 33 in FIG. 2, will be configured as a source-follower, whereby the output at the source follows the potential at the drain. (This configuration is analogous to the emitter follower configuration for a bipolar junction transistor.) It may therefore be desirable to use a voltage multiplier with greater gain in such applications, in order to assure the correct switching operation of these PMOS transistors.

Finally, it is to be understood that various modifications and/or additions may be made to the active rectifier without departing from the ambit of the present invention as defined in the claims appended hereto.

For example, whilst reference has been made in the above description to MOS transistors, other embodiments may use other types of transistors having one control electrode and two conductive electrodes, such as bipolar junction transistors. In this latter case, the comparators and, the case being, the voltage multipliers may be adapted to provide a base current sufficient to drive the bipolar junction transistors into saturation and thus to reduce their collector-emitter voltage to substantially zero. It then suffices to properly take into account in the circuit design the parasitic junction diodes resulting from the diffusion of the bipolar junction transistors in order to achieve the advantages of the present invention.

Whilst the above-described examples include transistors created in an n-type substrate and/or a p-type well, it is to be appreciated that the invention also applies to transistors which are created in a p-type substrate or an n-type well.

We claim:

1. An active rectifier for use in a power supply circuit, said active rectifier comprising,
    a diode connected between an input terminal and an output terminal,
    a transistor formed in a substrate and having a control electrode and two conductive electrodes, said conductive electrodes being connected respectively to said input terminal and said output terminal, and
    a comparator supplied by said power supply circuit and having two inputs respectively connected to said input terminal and said output terminal, and an output connected to said transistor control electrode said active rectifier being characterised in that:
        said diode is constituted by a parasitic junction diode formed in said substrate, and
        said active rectifier further comprises a voltage multiplier connected directly between said comparator output and said transistor control terminal.

2. An active rectifier according to claim 1, wherein said transistor is a MOS transistor.

3. A bridge rectifier for use in a power supply circuit, said bridge rectifier comprising:
    a first rectifier connected between a first input terminal and a first output terminal,
    a second rectifier connected between a second input terminal and said first output terminal,
    a third rectifier connected between said first input terminal and a second output terminal, and
    a fourth rectifier connected between said second input terminal and said second output terminal,
    said bridge rectifier being characterised in that at least one of said first, second, third or fourth active rectifiers are constituted by an active rectifier according to either of claims 1 or 2.

4. A bridge rectifier according to claim 3, characterised in that the transistor forming part of at least one of said first or second active rectifiers is a p-type MOS transistor.

5. A bridge according to claim 4, characterised in that said third active rectifier comprises:
    an n-type MOS transistor formed in said substrate and having a gate, drain and source, said drain and source being connected between said first input terminal and said second output terminal, and
    a parasitic junction diode formed in said substrate and connected between said second output terminal and said first input terminal.

6. A bridge rectifier according to claim 4, characterised in that said fourth active rectifier comprises:
    an n-type MOS transistor formed in said substrate and having a gate, drain and source, said drain and source being connected between said second input terminal and said second output terminal, and
    a parasitic junction diode formed in said substrate between said second output terminal and said first output terminal.

7. A bridge rectifier according to claim 3, characterised in that the transistor forming part of at least one of said first or second active rectifiers is a n-type MOS transistor.

8. A bridge rectifier according to claim 7, characterised in that said third active rectifier comprises:
    a p-type MOS transistor formed in said substrate and having a gate, drain and source, these latter two being connected between said first input terminal and said second output terminal, and
    a parasitic junction diode formed in said substrate and connected between said second output terminal and said first input terminal.

9. A bridge rectifier according to claim 7, characterised in that said fourth active rectifier comprises:
    a p-type MOS transistor formed in said substrate and having a gate, drain and source, said drain and source being connected between said second input terminal and said second output terminal, and
    a parasitic junction diode formed in said substrate between said second output terminal and said first output terminal.

10. A bridge rectifier according to claim 3, characterised in that the transistors constituting part of said first, second, third and fourth active rectifiers are formed in said substrate as CMOS transistors.

11. A bridge rectifier according to claim 3 and further comprising at least one first ring formed in said substrate and entirely surrounding one of said transistors, said first ring acting as a pseudo-collector for said one transistor.

12. A bridge rectifier according to claim 3, characterised in that the transistors constituting said first and fourth active rectifiers are separated from each other in said substrate by one of the transistors constituting said second or third active rectifiers, and in that the transistors constituting said second and third active rectifiers are separated from each other in said substrate by one of the transistors constituting said first or fourth active rectifiers.

13. A wrist-watch comprising an AC generator and a time-keeping circuit, characterised in that said AC generator and said time-keeping circuit are interconnected by an active rectifier according to claim 1.

14. A wrist-watch comprising an AC generator and a time-keeping circuit, characterised in that said AC generator and said time-keeping circuit are interconnected by a bridge rectifier according to claim 3.

15. A bridge rectifier according to claim 4, characterised in that said fourth active rectifier comprises:

an n-type MOS transistor formed in said substrate and having a gate, drain and source, said drain and source being connected between said second input terminal and said second output terminal, and a parasitic junction diode formed in said substrate between said second output terminal and said first output terminal.

16. A bridge rectifier according to claim 8, characterised in that said fourth active rectifier comprises:

p-type MOS transistor formed in said substrate and having a gate, drain and source, said drain and source being connected between said second input terminal and said second output terminal, and a parasitic junction diode formed in said substrate between said second output terminal and said first output terminal.

17. A bridge rectifier according to claim 9, characterised in that the transistors constituting part of said first, second, third and fourth active rectifiers are formed in said substrate as CMOS transistors.

18. A bridge rectifier according to claim 10 and further comprising at least one first ring formed in said substrate and entirely surrounding one of said transistors, said first ring acting as a pseudo-collector for said one transistor.

19. A bridge rectifier according to claim 11, characterised in that the transistors constituting said first and fourth active rectifiers are separated from each other in said substrate by one of the transistors constituting said second or third active rectifiers, and in that the transistors constituting said second and third active rectifiers are separated from each other in said substrate by one of the transistors constituting said first or fourth active rectifiers.

20. A wrist-watch comprising an AC generator and a time-keeping circuit, characterised in that said AC generator and said time-keeping circuit are interconnected by an active rectifier according to claim 2.

* * * * *